US012168893B2

(12) United States Patent
Patel et al.

(10) Patent No.: US 12,168,893 B2
(45) Date of Patent: Dec. 17, 2024

(54) SLIDE LATCHING SYSTEM FOR A DOOR SYSTEM

(71) Applicant: Allegion Access Technologies LLC, Carmel, IN (US)

(72) Inventors: Vinay N. Patel, Berlin, CT (US); Thomas M. Kowalczyk, Unionville, CT (US); Ronald Laliberte, Farmington, CT (US); James Cavanaugh, Farmington, CT (US); Daniel R. Seymour, New Britain, CT (US)

(73) Assignee: Allegion Access Technologies LLC, Carmel, IN (US)

( * ) Notice: Subject to any disclaimer, the term of this patent is extended or adjusted under 35 U.S.C. 154(b) by 438 days.

(21) Appl. No.: 16/468,231

(22) PCT Filed: Dec. 11, 2017

(86) PCT No.: PCT/US2017/065567

§ 371 (c)(1),
(2) Date: Jun. 10, 2019

(87) PCT Pub. No.: WO2018/107152

PCT Pub. Date: Jun. 14, 2018

(65) Prior Publication Data

US 2019/0309538 A1 Oct. 10, 2019

Related U.S. Application Data

(60) Provisional application No. 62/432,371, filed on Dec. 9, 2016.

(51) Int. Cl.

*E05B 7/00* (2006.01)
*E05B 15/02* (2006.01)

(Continued)

(52) U.S. Cl.

CPC ............ *E05B 7/00* (2013.01); *E05B 15/0205* (2013.01); *E05B 65/0811* (2013.01);

(Continued)

(58) Field of Classification Search

CPC .... E05B 15/0205; E05B 7/00; E05B 65/0811; E05B 65/08; E05C 3/00; E05C 3/004;

(Continued)

(56) References Cited

U.S. PATENT DOCUMENTS 19,614 A * 3/1858 Ball .......................... E05C 3/30 292/124
466,419 A * 1/1892 Kelley .................... E05B 85/24 292/123

(Continued)

FOREIGN PATENT DOCUMENTS

DE 3116706 A1 * 4/1981
DE 3825303 A1 * 7/1988 ............... E05B 7/00
FR 2968335 A1 * 6/2012 ............... E05B 7/00

OTHER PUBLICATIONS

Annotated translation of previously cited FR 2968335 A1 (Year: 2012).*

(Continued)

*Primary Examiner* — Christine M Mills
*Assistant Examiner* — Peter H Watson
(74) *Attorney, Agent, or Firm* — Taft Stettinius & Hollister LLP

(57) ABSTRACT

A slide latching system for latching a sliding door panel to a door frame includes a jamb strike, a latch assembly, and a handle set. The jamb strike is connected to the door frame. The latch assembly is connected to the sliding door panel, and has a latch member having a latch hook portion configured to engage the jamb strike. The latch hook portion is movable between a latched position and an unlatched posi- (Continued)

tion. The handle set is mounted to the sliding door panel. The handle set is drivably coupled to the latch assembly. The handle set is configured to facilitate both of a moving of the latch hook portion of the latch assembly to the unlatched position and a sliding of the sliding door panel in a first direction in a continuous motion applied to the handle set by a user.

16 Claims, 6 Drawing Sheets

(51) Int. Cl.
*E05B 65/08* (2006.01)
*E05C 3/16* (2006.01)

(52) U.S. Cl.
CPC .............. *E05C 3/162* (2013.01); *E05C 3/167* (2013.01); *E05B 65/08* (2013.01)

(58) Field of Classification Search
CPC ..... E05C 3/02; E05C 3/06; E05C 3/08; E05C 3/12; E05C 3/16; E05C 3/162; E05C 3/30; Y10S 292/26; Y10T 292/0911; Y10T 292/0929; Y10T 292/093; Y10T 292/0932; Y10T 292/0946; Y10T 292/0947; Y10T 292/0948; Y10T 292/0949; Y10T 292/1054; Y10T 292/1055; Y10T 292/1056; Y10T 292/1059; Y10T 292/1076; Y10T 292/1077; Y10T 292/108; Y10T 292/57; Y10T 292/1078
See application file for complete search history.

(56) References Cited

U.S. PATENT DOCUMENTS 2,538,913 A * 1/1951 Roethel .................. E05B 85/28 292/DIG. 56
3,869,159 A * 3/1975 Eads ......................... E05C 1/14 292/92
4,973,091 A * 11/1990 Paulson .................. E05C 9/042 292/216
5,458,381 A * 10/1995 Dziuk ....................... E05B 7/00 292/336.3
5,820,170 A * 10/1998 Clancy ................ E05B 65/0858 292/26
6,679,533 B1 * 1/2004 Bruner ................ E05B 15/0205 292/346
7,418,845 B2 9/2008 Timothy
8,083,269 B2 12/2011 Mitchell
8,876,178 B1 * 11/2014 Minter ...................... E05B 7/00 292/336.3
2010/0327612 A1 * 12/2010 Liebel ....................... E05B 1/00 292/336.3
2013/0020813 A1 * 1/2013 Storr ..................... E05B 63/244 292/150
2013/0334829 A1 * 12/2013 Hagemeyer ............. E05B 1/003 292/336.3

OTHER PUBLICATIONS

International Search Report and Written Opinion, PCT Appln. No. PCT/US17/65567, Feb. 20, 2018, 7 pgs.
Canadian Examination Report; Canadian Intellectual Property Office; Canadian Patent Application No. 3,046,488; May 17, 2024; 4 pages.

* cited by examiner

SLIDE LATCHING SYSTEM FOR A DOOR SYSTEM

CROSS-REFERENCE TO RELATED APPLICATIONS

This application claims priority to U.S. provisional patent application Ser. No. 62/432,371 that was filed on Dec. 9, 2016, which is incorporated herein by reference.

TECHNICAL FIELD

The present invention relates to a door system having at least one slidable door panel, such as a sliding health care or intensive care unit/critical care unit (ICU/CCU) door.

BACKGROUND ART

Entry doors for hospital ICU/CCU rooms are typically equipped with doors which have the ability to both slide closed, and under emergency circumstances or for convenience, swing open to provide greater access to the ICU/CCU room. Previously, the ICU/CCU rooms were equipped with manual sliding doors that provided for full access into or out of the room through the breakaway provision of the sliding door.

What is needed in the art is a door system having a handle set that provides for intuitive unlatching and sliding of the sliding door panel in a continuous motion.

SUMMARY OF INVENTION

The present invention provides a door system having a handle set that provides for intuitive unlatching and sliding of the sliding door panel in a continuous motion.

The invention in one form is directed to a slide latching system for latching a sliding door panel to a door frame. The slide latching system includes a jamb strike, a latch assembly, and a handle set. The jamb strike is connected to the door frame. The latch assembly is connected to the sliding door panel, and has a latch member having a latch hook portion configured to engage the jamb strike. The latch hook portion is movable between a latched position and an unlatched position. The handle set is mounted to the sliding door panel. The handle set is drivably coupled to the latch assembly. The handle set is configured to facilitate both of a moving of the latch hook portion of the latch assembly to the unlatched position and a sliding of the sliding door panel in a continuous motion applied to the handle set by a user.

BRIEF DESCRIPTION OF DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DESCRIPTION OF EMBODIMENTS

Figure 1:
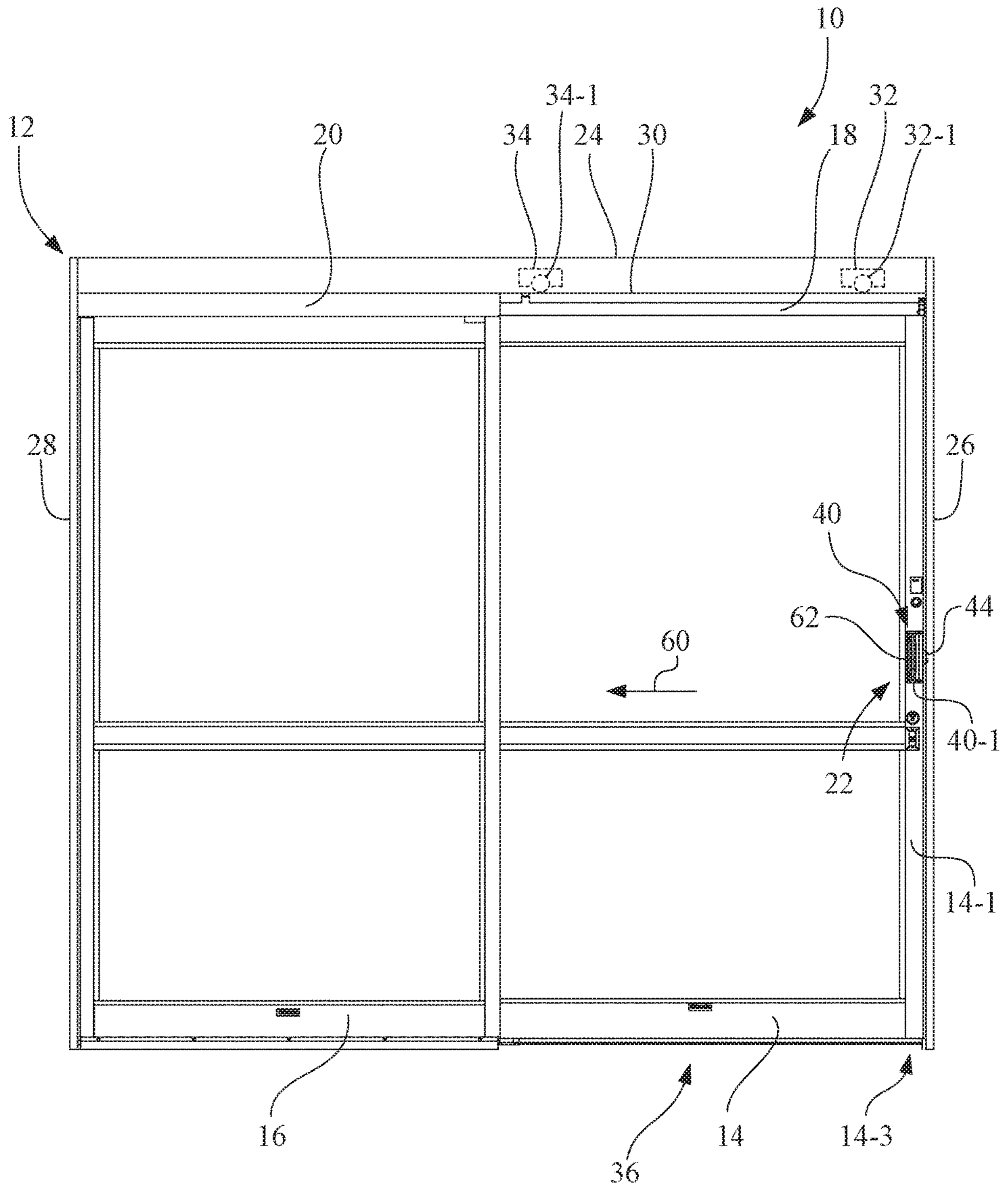
FIG. 1 is an exterior side view of a door system having a slidable door panel, with the sliding door panel in the closed position.

Referring now to the drawings, and more particularly to FIG. 1, there is shown a door system 10 having a door frame 12, a door panel 14, a door panel 16, a panel hanger member 18, a panel hanger member 20, and a slide latching system 22. Door system 10 incorporating door panel 14 and door panel 16 provides visibility access into and out of a room.

In the present embodiment, one door panel, i.e., door panel 14, is telescopic, i.e., slidable, to allow a greater clear door opening for a given rough opening, thereby providing flexible access to overall and individual patient areas. Door panel 16 may be coupled to door frame 12 in a manner to prohibit sliding motion. Door system 10 includes trackless threshold features, thereby minimizing access obstacles. Door system 10 may be further configured such that door panel 14 and door panel 16 may be allowed to breakout (i.e., to be swung open) under certain circumstances. Door system 10 may also include seals to provide smoke and draft controls.

Door frame 12 includes a header member 24, a jamb member 26, and a jamb member 28. Jamb member 28 is spaced from jamb member 26, with header member 24 extending between jamb member 26 and jamb member 28. Jamb member 26, jamb member 28, and header member 24 are interconnected, e.g., by mechanical fasteners, such as screws or bolts, to form an upside down U-shaped structure.

Panel hanger member 20 is fixedly attached to door frame 12, e.g., mechanical fasteners. Door panel 16 is located to be adjacent jamb member 28, and is connected to door frame 12 via panel hanger member 20 in a manner such that door panel 16 is prevented from sliding movement relative to door frame 12 in all circumstances.

Header member 24 includes an elongate support rail 30. Panel hanger member 18 is slidably coupled to header member 24 via at least two roller assemblies 32, 34, each having one or more rollers, e.g., rollers 32-1, 34-1 that ride on support rail 30 of header member 24, as is known in the art. Door panel 14 and door panel 16 are positioned within door frame 12 and staggered in a telescoping manner.

Door panel 14 has an exterior side 14-1, an interior side 14-2, and a handle end portion 14-3. Door panel 14 is connected to panel hanger member 18, e, g., by fasteners, such as bolts and/or screws, such that door panel 14 and panel hanger member 18 slide in unison between a closed position 36 (see FIG. 1) and an open position 38 (see FIG. 2). Thus, door panel 14 is slidably coupled to door frame 12. In the closed position 36, door panel 14 is positioned adjacent jamb member 26.

Figure 2:
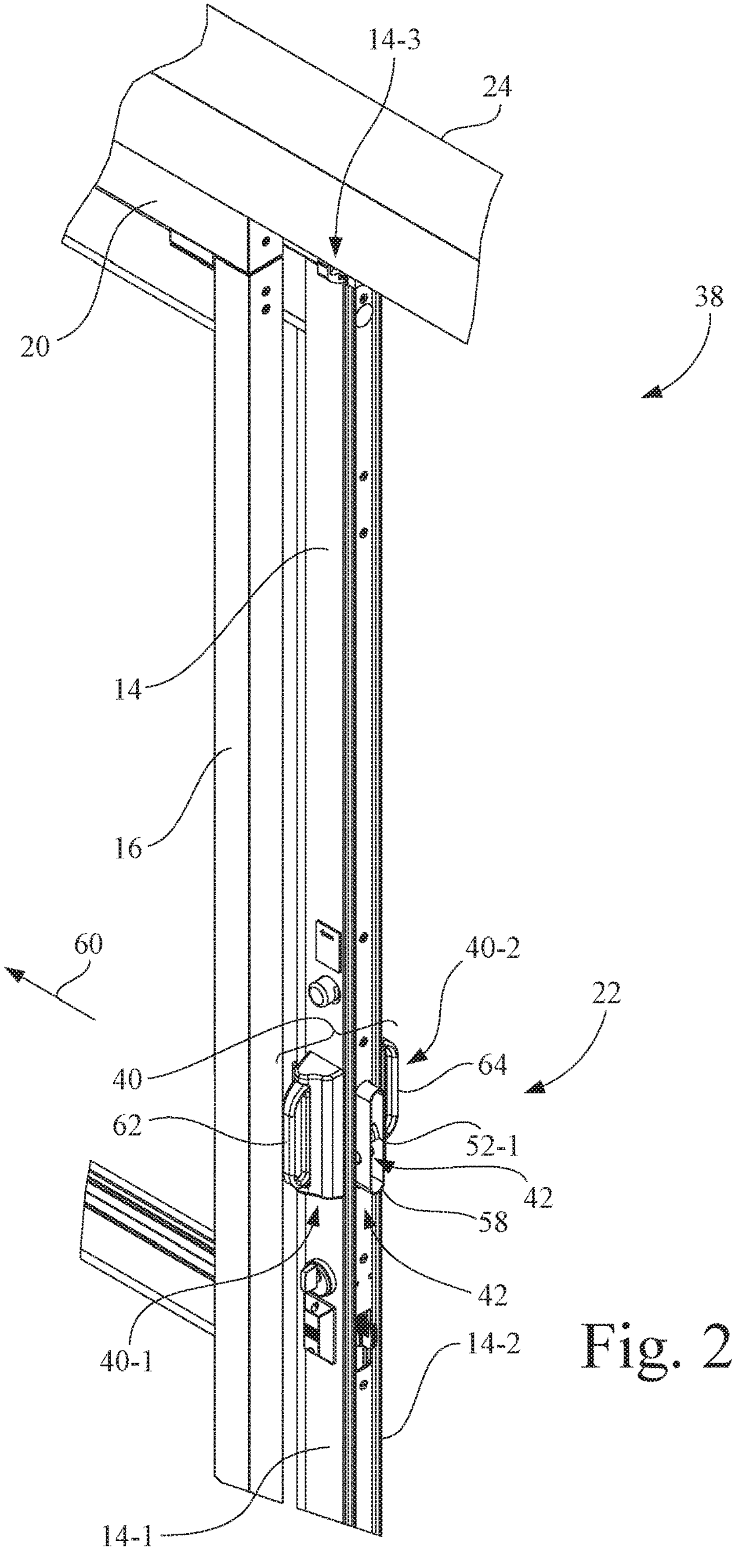
FIG. 2 is an exterior perspective view of a portion of the door system of FIG. 1, with the sliding door panel in an open position.

Referring to FIGS. 1 and 2, slide latching system 22 includes paddle handle assembly 40, a latch assembly 42, and a jamb strike 44. Paddle handle assembly 40 may include an exterior handle set 40-1 mounted to exterior side 14-1 of sliding door panel 14 and an interior handle set 40-2 mounted to interior side 14-2 of sliding door panel 14. Jamb strike 44 is connected to, and extends within, a recess of jamb member 26 of door frame 12.

Figure 3:
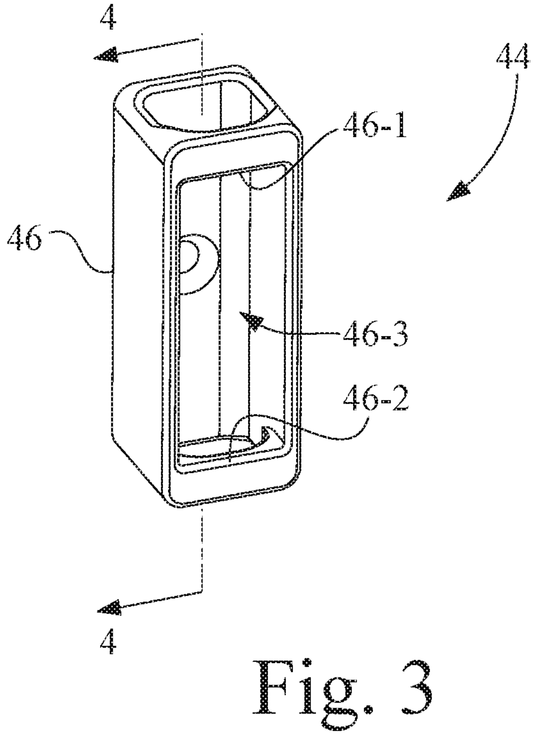
FIG. 3 is a perspective view of the jamb strike of the door system of FIG. 1.
Figure 4:
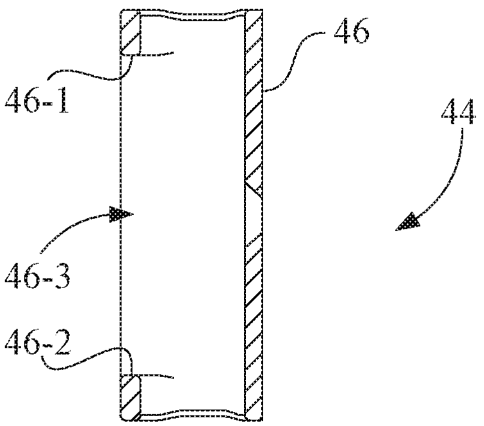
FIG. 4 is a section view of the jamb strike of FIG. 3, taken along line 4-4 of FIG. 3.

Referring also to FIGS. 3 and 4, jamb strike 44 may be configured as an insert to be inserted into the recess in jamb member 26. To reduce noise and friction, jamb strike 44 is made from a durable polymer material, and in the present embodiment, is made from a nylon material, such as Nylatron®, available from Polymer Corporation of Reading Pa., but is not limited in this regard and can include any suitable material adapted for friction and noise reduction.

Jamb strike 44 includes a body 46 having an upper strike catch 46-1, a lower strike catch 46-2, and a cavity 46-3 between the upper strike catch 46-1 and the lower strike catch 46-2. Cavity 46-3 extends into body 46 and behind each of the upper strike catch 46-1 and the lower strike catch 46-2. While jamb strike 44 has two strike catches 46-1, 46-2, only the upper strike catch 46-1 is used during a latching of door panel 14 to jamb member 26 of door frame 12. As such, when upper strike catch 46-1 experiences an amount wear that is no longer acceptable, then jamb strike 44 is inverted, top-to-bottom, such that lower strike catch 46-2 becomes a new upper strike catch for releasable engagement with latch assembly 42. Latch assembly 42 is connected to, and extends into an end recess of, door panel 14.

Figure 5:
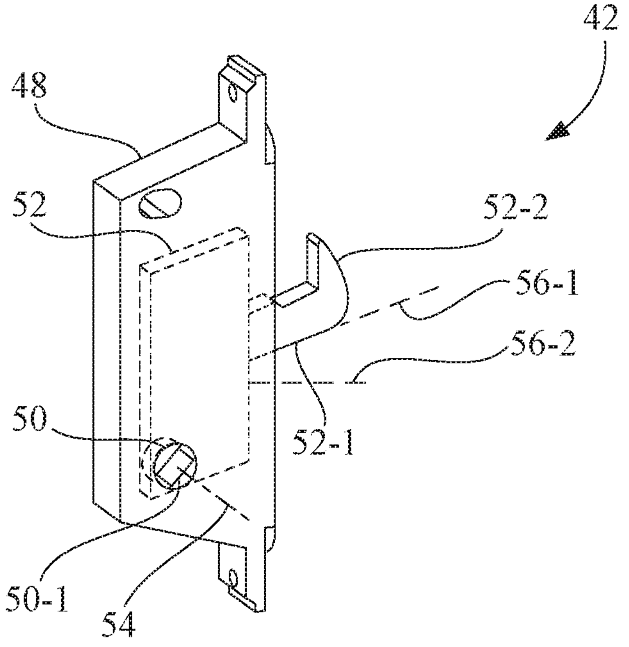
FIG. 5 is a perspective view of the latch assembly of the door system of FIG. 1, with a hidden portion of the latch member shown by dashed lines.

Referring to FIG. 5, latch assembly 42 has a latch housing 48, a rotary actuator 50, and a latch member 52, as is known in the art. Rotary actuator 50 defines a latch pivot axis 54. Rotary actuator 50 includes opposed slotted ends 50-1, which may be an axial through slot, for receiving a drive portion of each of exterior handle set 40-1 and interior handle set 40-2. Latch member 52 has a latch hook portion 52-1 having an upwardly extending hook 52-2. Latch hook portion 52-1 is configured to engage jamb strike 44, and in particular, to enter into cavity 46-3 of the latch member 52 and to latchably engage upper strike catch 46-1. Latch hook portion 52-1 of latch member 52 is drivably coupled to rotary actuator 50 such that latch member 52 and the rotary actuator 50 pivot about latch pivot axis 54 in unison. Latch hook portion 52-1 is movable (pivots) between a latched position 56-1 (upper position) and an unlatched position 56-2 (lower position), wherein latch hook portion 52-1 of the latch member 52 operably engages only the upper strike catch 46-1 of jamb strike 44 (see also FIG. 3) when in latched position 56-1.

Figure 6:
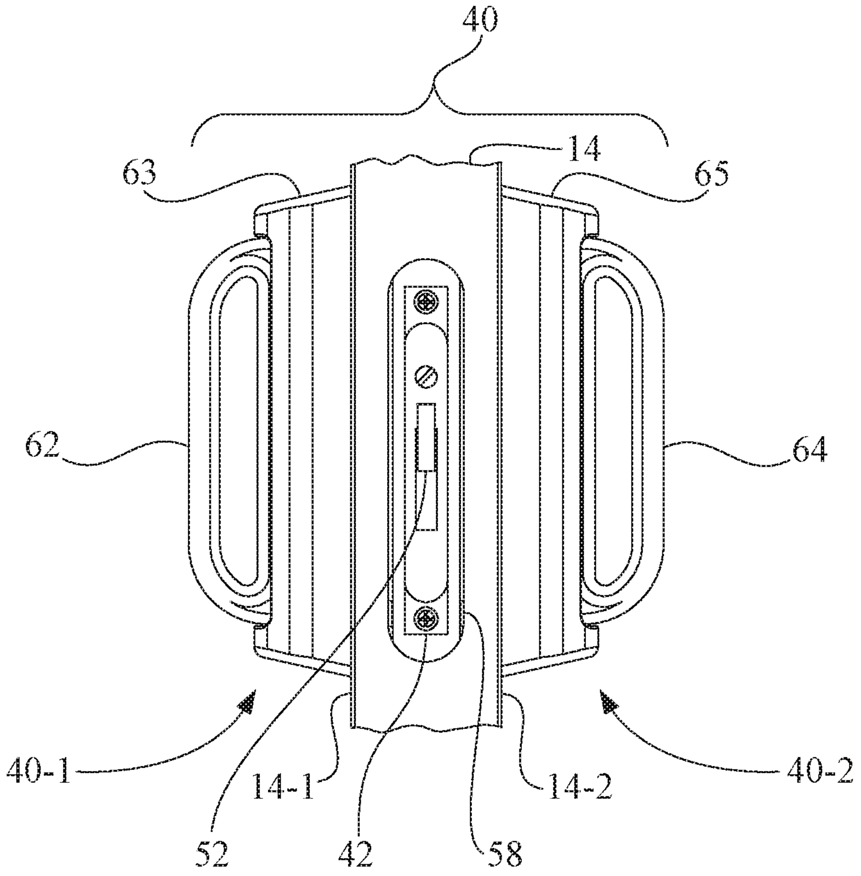
FIG. 6 is an end view of the sliding door panel and paddle handle assembly of the door system of FIG. 1, and showing an exterior handle set and an interior handle set of the paddle handle assembly.

Additionally, as shown in FIGS. 2 and 6, latch assembly 42 may include a covering element 58, such as a shroud, to surround latch hook portion 52-1 of the latch member 52 that is exposed from the edge of sliding door panel 14.

Paddle handle assembly 40 latches door panel 14 to jamb member 26 when sliding door panel 14 is slid to the closed position 36. In accordance with an aspect of the present invention, each of exterior handle set 40-1 and interior handle set 40-2 is configured such that a continuous motion applied by a user in direction 60 can both unlatch latch assembly 42 and slide sliding door panel 14 to the open position 38, as will be described in more detail below.

Referring to FIGS. 1, 2, 6 and 7, exterior handle set 40-1 has an exterior paddle handle 62 and exterior cover 63, and interior handle set 40-2 has an interior paddle handle 64 and an interior cover 65. Each of exterior paddle handle 62 and interior paddle handle 64 has a curved design to prevent intravenous (IV) lines, wires, or clothing from getting caught on the respective handle. Notwithstanding, it is contemplated that the paddle handles of paddle handle assembly 40 may include other designs, such as a hook or L-shape.

Each of exterior handle set 40-1 and interior handle set 40-2 is configured to facilitate both of a moving of latch hook portion 52-1 of latch assembly 42 to the unlatched position 56-2 and a sliding of the sliding door panel in a continuous, e.g., a single substantially linear, motion in direction 60 as a result of a force in direction 60 applied by a user.

Figure 7:
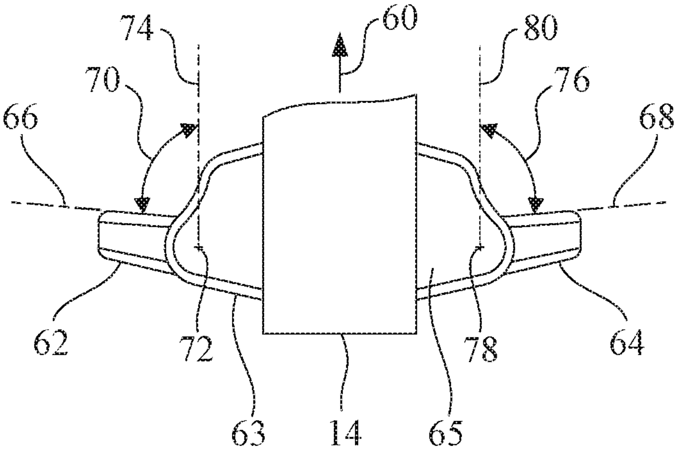
FIG. 7 is a top view of the paddle handle assembly of the door system of FIG. 6.

FIG. 7 shows exterior paddle handle 62 in a home position 66 and shows interior paddle handle 64 in a home position 68. When exterior paddle handle 62 is in home position 66, exterior paddle handle 62 is oriented at an acute angle 70 (e.g., approximately 85 degrees) relative to a planar extent (in direction 60) of sliding door panel 14. When exterior paddle handle 62 is pivoted about a vertical handle pivot axis 72 to an actuated position 74, exterior paddle handle 62 is oriented to be substantially parallel to the planar extent (in direction 60) of the sliding door panel 14. Likewise, when interior paddle handle 64 is in home position 68, interior paddle handle 64 is oriented at an acute angle 76 (e.g., approximately 85 degrees) relative to a planar extent (in direction 60) of sliding door panel 14, and when interior paddle handle 64 is pivoted about a vertical handle pivot axis 78 to an actuated position 80, interior paddle handle 64 is oriented to be substantially parallel to the planar extent (in direction 60) of the sliding door panel 14.

In the present embodiment, exterior handle set 40-1 and interior handle set 40-2 are configured as mirror images of one another, and thus, for brevity, only the exterior handle set 40-1 will be described in detail. As such, it is to be understood that any discussion that follows directed to the exterior handle set 40-1 will equally apply to the interior handle set 40-2, as being mirror images of one another. Also, it is contemplated that in some implementations, paddle handle assembly 40 may include only one of exterior handle set 40-1 or interior handle set 40-2.

Figure 8:
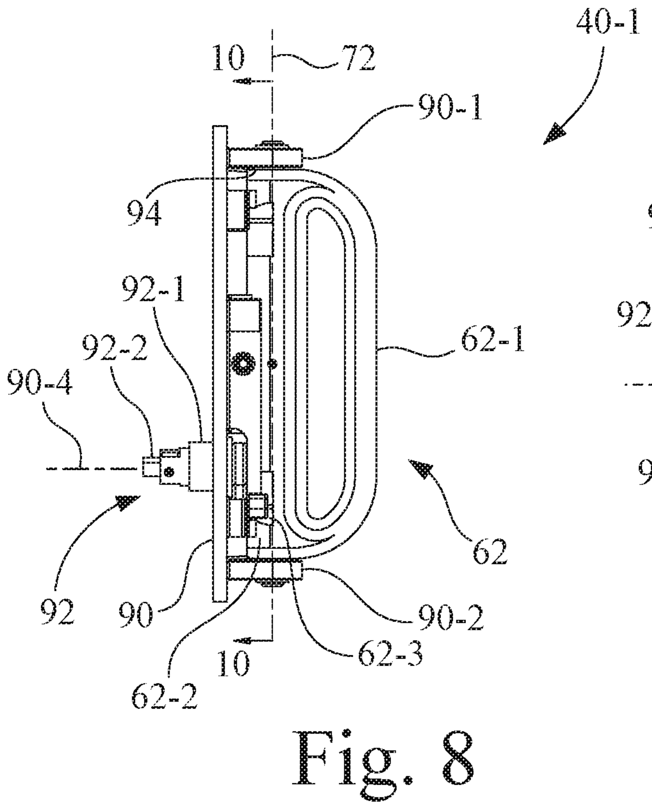
FIG. 8 is a side view of the exterior handle set of FIG. 6, with the cover removed.
Figure 9:
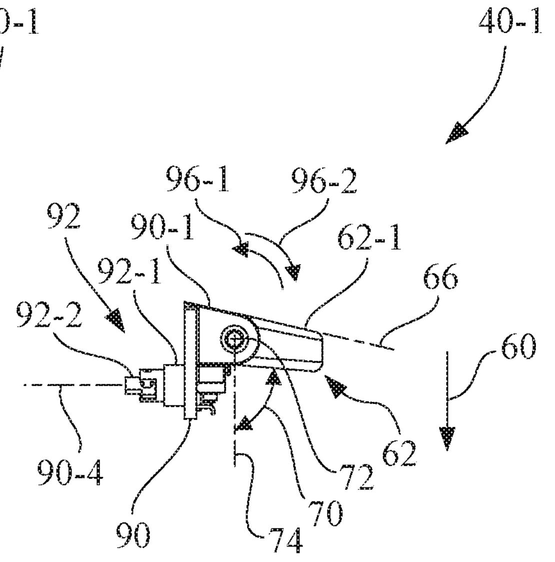
FIG. 9 is a top view of the exterior handle set of FIG. 8.
Figure 10:
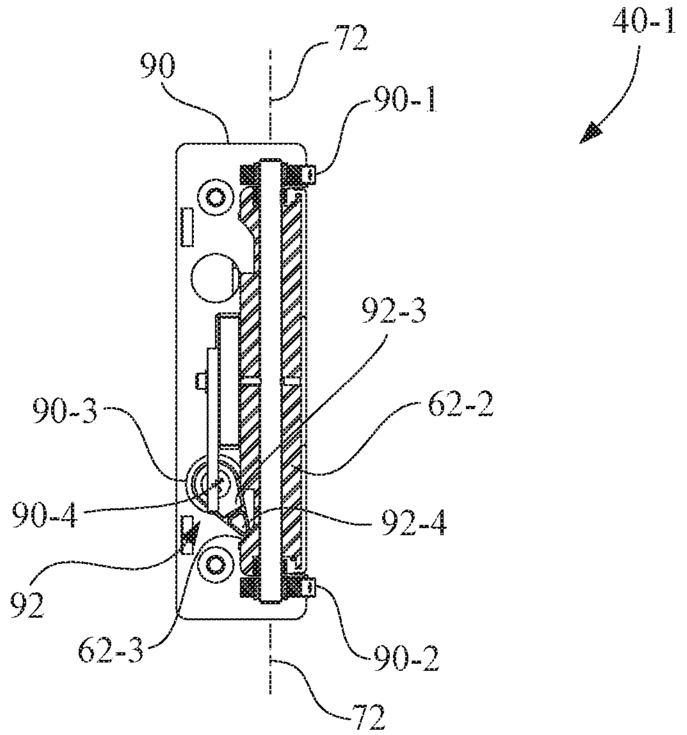
FIG. 10 is a section view of the exterior handle set of FIG. 8, taken along line 10-10 of FIG. 8.

Referring to FIGS. 8-10, exterior handle set 40-1 includes exterior paddle handle 62, a base 90, and a cam 92. Exterior handle set 40-1 further includes a biasing member 94 (see FIG. 8), e.g., one or more torsion springs, that apply a torsional force to exterior paddle handle 62 in a first rotary direction 96-1 (see FIG. 9) to position exterior paddle handle 62 in home position 66.

Referring to FIGS. 1 and 2, base 90 plate of exterior handle set 40-1 is mounted to the exterior side 14-1 of sliding door panel 14. Referring again to FIGS. 8-10, exterior paddle handle 62 is rotatably mounted to the base 90 plate to pivot about handle pivot axis 72.

Base 90 plate includes an upper pivot arm 90-1, a lower pivot arm 90-2, and a cam mounting hole 90-3. Upper pivot arm 90-1 and lower pivot arm 90-2 of base 90 plate are axially aligned, e.g., vertically aligned, along handle pivot axis 72. Exterior paddle handle 62 is positioned between upper pivot arm 90-1 and lower pivot arm 90-2. Exterior paddle handle 62 is pivotably coupled to each of upper pivot arm 90-1 and lower pivot arm 90-2 by a respective pivot arrangement, such as a pin/hole arrangement, arranged along handle pivot axis 72. Handle pivot axis 72 is oriented to be substantially vertical.

Exterior paddle handle 62 includes an operator portion 62-1 and a driver portion 62-2, with the operator portion 62-1 and the driver portion 62-2 being located on opposite sides of handle pivot axis 72. Driver portion 62-2 includes a cam driver 62-3, e.g., a beveled surface, which is slidably engaged with cam 92.

Cam mounting hole 90-3 of base 90 defines a cam axis 90-4, and rotatably mounts cam 92. Cam axis 90-4 is oriented to be substantially horizontal. Cam 92 is rotatably mounted to base 90, e.g., by a bushing/snap ring arrangement, so as to pivot about cam axis 90-4.

Figure 11A:
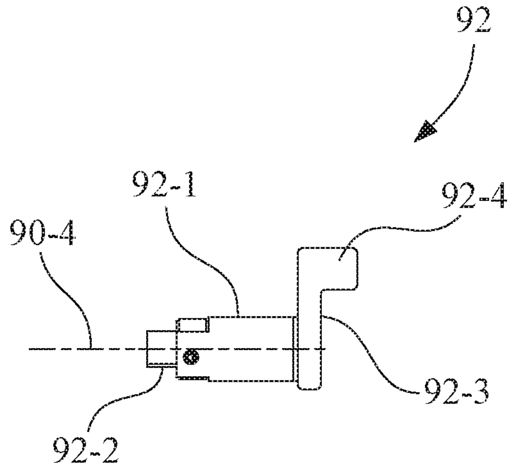
FIG. 11A is a side view of the cam of the exterior handle set of FIG. 8.
Figure 11B:
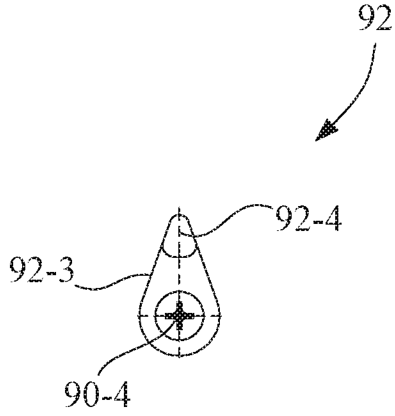
FIG. 11B is an end view of the cam of FIG. 11A.

Referring also to FIGS. 11A and 11B, cam 92 includes a barrel 92-1, e.g., a cylindrical portion, having a driver end portion 92-2, and has a cam arm 92-3 having a driven end portion 92-4. Cam arm 92-3 extends substantially orthogonally from the barrel 92-1 such that driven end portion 92-4 of cam arm 92-3 is offset from cam axis 90-4.

Referring again to FIGS. 8 and 10, driven end portion 92-4 of cam arm 92-3 of cam 92 is drivably engaged by cam driver 62-3 of driver portion 62-2 of exterior paddle handle 62. Cam mounting hole 90-3 of base 90 plate is configured to receive barrel 92-1 of cam 92, with barrel 92-1 extending through the cam mounting hole 90-3 such that the driver end portion 92-2 of barrel 92-1 engages rotary actuator 50 of latch assembly 42 (see also FIG. 5). More particularly, driver end portion 92-2 is in the form of a drive tab that drivably engages the corresponding drive slot, i.e., one of the opposed slotted ends 50-1, in rotary actuator 50 of latch assembly 42.

In operation, a pivoting of exterior paddle handle 62 about handle pivot axis 72 between home position 66 and actuated position 74 causes a corresponding rotation of the cam 92 about cam axis 90-4 to effect a movement of latch hook portion 52-1 of latch assembly 42 from the latched position 56-1 to the unlatched position 56-2.

In operation, referring particularly to FIGS. 1, 2, and 8-10, to open the latched sliding door panel 14, the user pulls exterior paddle handle 62 in direction 60, i.e., the opening direction of sliding door panel 14, which in turn pivots exterior paddle handle 62 in a second rotary direction 96-2 about the handle pivot axis 72 to the actuated position 74 to unlatch latch assembly 42 and to slide sliding door panel 14 to the open position (see FIG. 2), all in the same continuous motion. It is noted that the second rotary direction 96-2 is opposite to the first rotary direction 96-1 effected by biasing member 94.

As exterior paddle handle 62 pivots in the second rotary direction 96-2 about handle pivot axis 72, cam driver 62-3 of the driver portion 62-2 of exterior paddle handle 62 rotates cam arm 92-3 of cam 92, and in turn rotates barrel 92-1 of cam 92 about cam axis 90-4, so as to rotate the rotary actuator 50 of latch assembly 42, which in turn moves latch hook portion 52-1 of latch member 52 to the unlatched position 56-2 (see FIG. 5) to thereby disengage latch hook portion 52-1 of the latch member 52 from upper strike catch 46-1 of jamb strike 44 (see FIG. 3) so as to permit a sliding opening of sliding door panel 14 in the same continuous motion as used to unlatch latch assembly 42.

As previously stated, interior handle set 40-2 is configured as a mirror image of exterior handle set 40-1. Accordingly, each of exterior handle set 40-1 and interior handle set 40-2 is configured to facilitate a moving of the latch hook portion 52-1 of the latch assembly 42 to the unlatched position 56-2 and a sliding of sliding door panel 14 by a continuous motion applied by a user in direction 60 to the respective exterior paddle handle 62 or interior paddle handle 64.

As used herein, "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

For definitional purposes and as used herein, "connected" or "attached" includes physical or electrical, whether direct or indirect, affixed or adjustably mounted. Thus, unless specified, "connected" or "attached" is intended to embrace any operationally functional connection.

Also, as used herein, the terms "interior" and "exterior" are terms of convenience used to distinguish between opposite sides of sliding door panel 14.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A slide latching system for latching a sliding door panel to a door frame, the slide latching system comprising:

a jamb strike configured for connection to the door frame, wherein the jamb strike includes at least one strike catch and a cavity;

a latch assembly configured for connection to the sliding door panel, the latch assembly having a latch member connected to a rotary actuator, the latch member having a latch hook portion configured to engage the jamb strike, the latch hook portion being pivotable between a latched position and an unlatched position by rotation of the rotary actuator;

a handle assembly including a handle set for mounting to the sliding door panel, the handle set being drivably coupled to the latch assembly, the handle set including a base, an upper pivot arm, a lower pivot arm, and a handle pivotably coupled to the base between the upper pivot arm and the lower pivot arm about a pivot axis extending between the upper pivot arm and the lower pivot arm, the handle including an operator portion and a driver portion on opposite sides of the pivot axis, the driver portion including a beveled surface, wherein the operator portion of the handle is configured to be pulled by a user in a direction of sliding for opening the sliding door panel; and a cam including a barrel with a driver end portion connected to the rotary actuator of the latch assembly, the cam including a cam arm extending perpendicularly from the barrel opposite the driver end portion, the cam is rotatably mounted to the base to rotate the barrel and cam arm about a cam axis, the cam arm including a driven end portion offset from the cam axis that projects outwardly from the cam arm along the cam axis, wherein the beveled surface of the driver portion of the handle is slidably engaged to the driven end portion of the cam arm, and pivoting the handle about the pivot axis in a continuous motion as a result of a force applied by the user to the operator portion in the direction of sliding for opening the sliding door panel to rotate the handle from a home position having an acute angle orientation of the handle relative to a planar extent of the sliding door panel to an actuated position having a parallel orientation of the handle to the planar extent of the sliding door panel causes the beveled surface of the driver portion of the handle to act on the driven end portion of the cam arm to rotate the cam arm and the barrel around the cam axis to rotate the rotary actuator of the latch assembly with the driver end portion of the cam and pivot the latch hook portion of the latch assembly to the unlatched position so that the sliding door panel is unlatched and the sliding door panel is opened using the same continuous motion applied to the operator portion of the handle to move the latch hook portion of the latch assembly to the unlatched position.

2. The slide latching system of claim 1, the latch assembly having a latch housing, the rotary actuator defining a latch pivot axis, the latch hook portion configured to engage the jamb strike, the latch member being drivably coupled to the rotary actuator such that the latch member and the rotary actuator pivot in unison, the latch hook portion being movable between the latched position and the unlatched position.

3. The slide latching system of claim 2, wherein the cam axis is oriented to be substantially horizontal, the driver end portion is drivably engaged with the rotary actuator of the latch assembly, and the pivot axis is oriented to be substantially vertical.

4. The slide latching system of claim 3, the handle set including a biasing member that pivots the handle in a first rotary direction to position the handle in the home position, and wherein the user pulls the handle to pivot the handle in a second rotary direction to the actuated position about the handle axis, the second rotary direction being opposite to the first rotary direction.

5. The slide latching system of claim 1, wherein the acute angle is substantially 85 degrees.

6. The slide latching system of claim 3, wherein the base has a cam mounting hole configured to receive the barrel of the cam, the barrel extending through the cam mounting hole such that the driver end portion engages the rotary actuator of the latch assembly.

7. The slide latching system of claim 1, wherein the at least one strike catch includes an upper strike catch, a lower strike catch, and a cavity between the upper strike catch and the lower strike catch, the cavity extending behind each of the upper strike catch and the lower strike catch.

8. The slide latching system of claim 7, wherein the latch hook portion of the latch member of the latch assembly operably engages only the upper strike catch so that only the upper strike catch is used during latching of the door, and when the upper strike catch experiences an amount wear that is no longer operable, then the jamb strike is inverted such that the lower strike catch becomes a new upper strike catch.

9. The slide latching system of claim 7, wherein the jamb strike is made from nylon material.

10. The slide latching system of claim 1, wherein the handle set is an exterior handle set mounted to an exterior side of the sliding door panel, and further including:

an interior handle set mounted to the interior side of the sliding door panel, the interior handle set being configured as a mirror image of the exterior handle set and configured to facilitate a moving of the latch hook portion of the latch assembly to the unlatched position and a sliding of the sliding door panel in an interior-side continuous motion applied by a user.

11. The slide latching system of claim 1, further comprising a shroud around the latch assembly, wherein the latch hook portion is exposed from an edge of the sliding door panel and in both the latched position and the unlatched position while surrounded by the shroud.

12. A slide latching system for latching a sliding door panel to a door frame, the slide latching system comprising:

a jamb strike configured for connection to the door frame, wherein the jamb strike includes at least one strike catch;

a latch assembly configured for connection to the sliding door panel, the latch assembly including a latch member connected to a rotary actuator, the latch member including a latch hook portion pivotable by rotation of the rotary actuator between a latched position engaged to the at least one strike catch and an unlatched position disengaged from the at least one strike catch; and a handle assembly for mounting to the sliding door panel in driving engagement with the latch assembly, the handle assembly including a base, an upper pivot arm, a lower pivot arm, and a handle pivotably coupled to the base between the upper pivot arm and the lower pivot arm about a pivot axis that extends vertically between the upper pivot arm and the lower pivot arm, the handle including an operator portion and a driver portion on opposite sides of the pivot axis, the driver portion including a beveled surface, wherein the handle pivots about the pivot axis in response to the operator portion being pulled by a user in a direction of sliding for opening the sliding door panel; and a cam including a barrel with a driver end portion connected to the rotary actuator of the latch assembly, the cam including a cam arm extending perpendicularly from the barrel opposite the driver end portion, the cam is rotatably mounted to the base to rotate the barrel and the cam arm about a cam axis, the cam arm including a driven end portion offset from the cam axis that projects outwardly from the cam arm along the cam axis, wherein the beveled surface of the driver portion of the handle is slidably engaged to the driven end portion of the cam arm, and pivoting the handle about the pivot axis in a continuous motion as a result of a force applied to the operator portion by the user in the direction of sliding for opening the sliding door panel to rotate the handle from a home position having an acute angle orientation of the operator portion relative to a planar extent of the sliding door panel to an actuated position having a parallel orientation of the handle to the planar extent of the sliding door panel causes the beveled surface of the driver portion of the handle to act on the driven end portion of the cam arm to rotate the cam arm and the barrel about the cam axis to rotate the rotary actuator of the latch assembly and pivot the latch hook portion of the latch assembly to the unlatched position so that the sliding door panel is unlatched and the sliding door panel is opened using the same continuous motion applied to the operator portion of the handle to move the latch hook portion of the latch assembly to the unlatched position.

13. The slide latching system of claim 12, the handle assembly including a biasing member that pivots the handle in a first rotary direction to position the handle in the home position, and wherein the user pulls the handle to pivot the handle in a second rotary direction to the actuated position about the handle pivot axis, the second rotary direction being opposite to the first rotary direction.

14. The slide latching system of claim 12, wherein the acute angle is substantially 85 degrees.

15. The slide latching system of claim 12, further comprising a shroud around the latch assembly, wherein the latch hook portion is exposed from an edge of the sliding door panel in both the latched position and the unlatched position while surrounded by the shroud.

16. The slide latching system of claim 12, wherein:

the at least one strike catch includes an upper strike catch, a lower strike catch, and a cavity between the upper strike catch and the lower strike catch, the cavity extending behind each of the upper strike catch and the lower strike catch; and the latch hook portion of the latch member of the latch assembly operably engages only the upper strike catch so that only the upper strike catch is used during latching of the door, and when the upper strike catch experiences an amount wear that is no longer operable, then the jamb strike is inverted such that the lower strike catch becomes a new upper strike catch.

* * * * *